(12) United States Patent
Pankanti et al.

(10) Patent No.: US 10,049,307 B2
(45) Date of Patent: Aug. 14, 2018

(54) VISUAL OBJECT RECOGNITION

(71) Applicant: INTERNATIONAL BUSINESS MACHINES CORPORATION, Armonk, NY (US)

(72) Inventors: Sharathchandra U. Pankanti, Darien, CT (US); Xi Peng, Piscataway, NJ (US); Nalini K. Ratha, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 15/089,707

(22) Filed: Apr. 4, 2016

(65) Prior Publication Data

US 2017/0286809 A1    Oct. 5, 2017

(51) Int. Cl.
  G06K 9/62    (2006.01)
  G06K 9/66    (2006.01)
  (Continued)

(52) U.S. Cl.
  CPC ........... G06K 9/66 (2013.01); G06K 9/00208 (2013.01); G06K 9/00228 (2013.01); G06N 3/04 (2013.01);
  (Continued)

(58) Field of Classification Search
  None
  See application file for complete search history.

(56) References Cited

U.S. PATENT DOCUMENTS 5,548,512 A * 8/1996 Quraishi ............. G05D 1/0255
                                                        180/167
6,819,790 B2 * 11/2004 Suzuki .................. G06T 7/0012
                                                        382/130
(Continued)

FOREIGN PATENT DOCUMENTS

CN    103530657 A    1/2014
CN    103778414 A    5/2014
CN    104573679 A    4/2015

OTHER PUBLICATIONS

Learning visual similarity for product design with convolution neural networks, Sean Bell et al, ACM, Aug. 2015, pp. 98:1 to 98:10.*

(Continued)

*Primary Examiner* — Jayesh A Patel
(74) *Attorney, Agent, or Firm* — Cantor Colburn LLP

(57) ABSTRACT

Technical solutions are described for training an object-recognition neural network that identifies an object in a computer-readable image. An example method includes assigning a first neural network for determining a visual alignment model of the images for determining a normalized alignment of the object. The method further includes assigning a second neural network for determining a visual representation model of the images for recognizing the object. The method further includes determining the visual alignment model by training the first neural network and determining the visual representation model by training the second neural network independent of the first. The method further includes determining a combined object recognition model by training a combination of the first neural network and the second neural network. The method further includes recognizing the object in the image based on the combined object recognition model by passing the image through each of the neural networks.

20 Claims, 8 Drawing Sheets

(51) Int. Cl.
*G06N 3/08* (2006.01)
*G06N 3/04* (2006.01)
*G06K 9/00* (2006.01)
*G06T 7/00* (2017.01)

(52) U.S. Cl.
CPC ............ *G06N 3/08* (2013.01); *G06T 7/0024* (2013.01); *G06T 2207/20081* (2013.01)

(56) References Cited

U.S. PATENT DOCUMENTS

| | | | | |
|---|---|---|---|---|
| 9,189,886 B2* | 11/2015 | Black | ................. | G06K 9/00369 |
| 9,418,319 B2* | 8/2016 | Shen | ..................... | G06K 9/4628 |
| 9,607,217 B2* | 3/2017 | Cetintas | ............. | G06K 9/00456 |
| 9,715,642 B2* | 7/2017 | Szegedy | .................. | G06K 9/66 |
| 2015/0161522 A1* | 6/2015 | Saon | ..................... | G06N 3/0454 |
| | | | | 706/12 |
| 2015/0178554 A1* | 6/2015 | Kanaujia | ................. | G06T 19/20 |
| | | | | 382/118 |
| 2016/0042253 A1* | 2/2016 | Sawhney | ............. | G06K 9/6255 |
| | | | | 382/190 |
| 2016/0379044 A1* | 12/2016 | Tang | .................. | G06K 9/00288 |
| | | | | 382/118 |

OTHER PUBLICATIONS

DeepFace—Verification., Taigman et al., IEEE, 1063-6919, 2014, pp. 1701-1708.*
Going deeper with convolutions, Szegedy et al., IEEE, 978-1-4673-6964-0, 2015, pp. 1-9.*
F. Schroff, et al., "FaceNet: A Unified Embedding for Face Recognition and Clustering", CVPR, Jun. 17, 2015, pp. 1-10.
D. M. Parkhi et al., "Deep Face Recognition", Visual Geometry Group, Department of Engineering Science, University of Oxford, BMVC, 2015, pp. 1-12.
Y. Taigman et al., "DeepFace: Closing the Gap to Human-Level Performance in Face Verification", CVPR, 2014, pp. 1-8.

* cited by examiner

| Group | Dataset | Approach | #subjects | #images | Accuracy |
|---|---|---|---|---|---|
| Example 1 | SFC | DeepFace/2014 | 4,030 | 4,400,000 | 97.35% |
| Example 2 | WebFace | FaceNet/2015 | 8,000,000 | 200,000,000 | 98.87% |
| This disclosure | CASIA | Split Network | 10,575 | 494,414 | 96.67% |

Fig. 8

VISUAL OBJECT RECOGNITION

BACKGROUND

The present application relates to computer technology, and more specifically, to improving the efficiency of training an artificial neural network system, which may be referred to as a neural network system.

A typical neural network uses layers of non-linear "hidden" units between inputs and outputs of the neural network. Each unit has a weight that is determined during learning, which is referred to as a training stage. In the training stage, a training set of data (for example, a training set of inputs each having a known output) is processed by the neural network. Thus, it is intended that the neural network learn how to provide an output for new input data by generalizing the information the neural network learns in the training stage from the training data. Generally, once learning is complete, a validation set is processed by the neural network to validate the results of learning. Finally, test data (for example, data for which generating an output is desired) can be processed by a validated neural network.

SUMMARY

According to an embodiment, a computer-implemented method for training an object-recognition neural network to identify an object in a computer-readable image includes assigning, using a processor system, a first neural network for determining a visual alignment model of the images. The visual alignment model is used to determine a normalized alignment of an object in input images. The method further includes assigning, using the processor system, a second neural network for determining a visual representation model of the images. The visual representation model is used to recognize the object in the input images. The method further includes determining the visual alignment model by training the first neural network. The method further includes determining the visual representation model by training the second neural network. The method further includes determining a combined object recognition model by training a combination of the first neural network and the second neural network. The method further includes recognizing the object in the computer-readable image based on the combined object recognition model by passing the computer-readable image through each of the combined neural networks.

According to another embodiment, a system for training an object-recognition neural network to identify an object in a computer-readable image includes a memory and a processor communicatively coupled to the memory. The processor assigns a first neural network for determining a visual alignment model of the images, where the visual alignment model is used to determine a normalized alignment of an object in input images. The processor assigns a second neural network for determining a visual representation model of the images. The visual representation model is used to recognize the object in the input images. The processor determines the visual alignment model by training the first neural network. The processor determines the visual representation model by training the second neural network. The processor determines a combined object recognition model by training a combination of the first neural network and the second neural network. The processor recognizes the object in the computer-readable image based on the combined object recognition model by passing the computer-readable image through each of the combined neural networks.

According to another embodiment, a computer program product for training an object-recognition neural network to identify an object in a computer-readable image includes a non-transitory computer readable storage medium. The computer readable storage medium includes computer executable instructions to assign a first neural network for determining a visual alignment model of the images. The visual alignment model is used to determine a normalized alignment of an object in input images. The computer readable storage medium includes computer executable instructions to assign a second neural network for determining a visual representation model of the images. The visual representation model is used to recognize the object in the input images. The computer readable storage medium includes computer executable instructions to determine the visual alignment model by training the first neural network; determine the visual representation model by training the second neural network. The computer readable storage medium includes computer executable instructions to determine a combined object recognition model by training a combination of the first neural network and the second neural network. The computer readable storage medium includes computer executable instructions to recognize the object in the computer-readable image based on the combined object recognition model by passing the computer-readable image through each of the combined neural networks.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

FIG. 8 illustrates a comparison of using a face-recognition neural network trained using different approaches in accordance with an embodiment.

DETAILED DESCRIPTION

"Machine learning" is used to broadly describe a primary function of electronic systems that learn from data. In machine learning and cognitive science, artificial neural networks (i.e., neural networks) are a family of statistical learning models inspired by the biological neural networks of animals, and in particular the brain. Artificial neural networks may be used to estimate or approximate systems and functions that depend on a large number of inputs and are generally unknown.

Artificial neural networks are often embodied in so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in artificial neural networks that carry electronic messages between simulated neurons are provided with numeric weights that correspond to the strength or weakness of a given connection. The weights can be adjusted and tuned based on experience, making artificial neural networks adaptive to inputs and capable of learning. For example, an artificial neural network for handwriting recognition is defined by a set of input neurons which may be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

Disclosed here are technical solutions for splitting a training of a neural network into component neural networks and assigning training systems to each of the component neural networks. The component neural networks are trained separately. In an example, an output from a first neural network is used for training a second neural network. Alternatively, the first neural network and the second neural network may be trained independent of each other, followed by a combined training for the neural network using a common dataset and the trained parameters of each separate component neural network. The disclosed technical solutions, by training each component neural network separately, facilitate using fewer resources than those for training the overarching neural network. Accordingly, training the overarching neural network may use fewer training samples, fewer computational resources and less time, than if the neural network was trained altogether. The disclosed technical solutions further facilitate parallelizing the training of the neural network by converting the neural network into a wide neural network, which is distinguished from a deep neural network. Thus, the disclosed technical solutions facilitate improving the efficiency of training the neural network.

Figure 1:
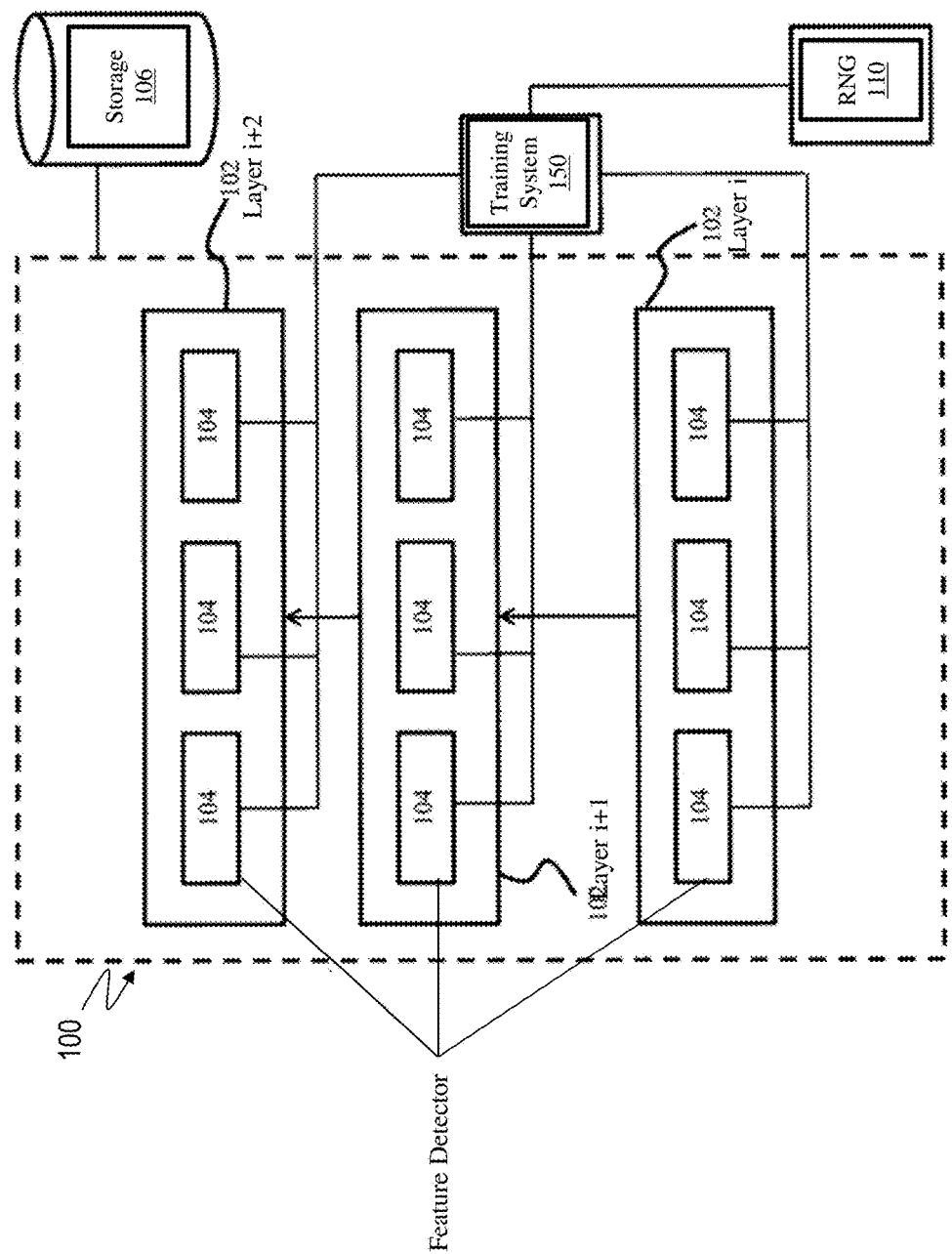
FIG. 1 illustrates a feedforward neural network in accordance with an embodiment.

Turning now to a more detailed description of one or more embodiments, FIG. 1 illustrates a feedforward neural network 100 having a plurality of layers 102. Each layer includes one or more feature detectors 104. Each feature detector 104 may be associated with activation functions and weights for each parameter input to the respective feature detector 104. Generally, the output of the feature detectors 104 of layer-i may be provided as input to one or more feature detector of layer i+1.

The neural network 100 is implemented by one or more processors. Each feature detector may be considered as a processing "node," and one or more nodes may be implemented by a processor. Further, a storage 106 may be provided for storing activations and learned weights for each feature detector 104. The storage 106 may further store a training set comprising training data. The training data may, for example, be used for image classification in which case the training data may comprise image data that represents images having known classifications. The storage 106 may further store a validation set comprising validation data.

During the training stage, the neural network 100 learns optimal weights for each feature detector 104. An optimal configuration can then be applied to test data. A training system 150 manages the training of the neural network 100. For example, the training system 150 may selectively enable/disable each feature detector 104 in the neural network 100 to which it is linked, with a learned or preconfigured probability. The training system 150 may include and/or communicate with a random number generator 110, which provides random values. The training system 150 enables/disables the feature detectors 140 based on the random values. The values generated by the random number generator 110 each correspond to a decision of whether to disable any particular feature detector 104 in accordance with the preconfigured probability.

Exemplary applications of such a neural network include image classification, object recognition, speech recognition, among others. Throughout the present document, a specific example scenario of face-recognition in three-dimensional space is used to describe the technical solutions described herein. However, it will be obvious to a person skilled in the art that the technical solutions are applicable to any other application of neural networks to improve the efficiency of training an artificial neural network.

For example, the present document describes applying the technical solutions to improve training a neural network that may be used for recognition a face from a single unconstrained image, when the images are confounded by many variations such as pose, occlusion, illumination, low resolution, age, decoration, expression, and the like and a combination thereof. An accurate recognition of faces from a set of enrolled faces has a wide variety of applications such as for security, human computer interface, and various other vertical industries.

Typical solutions of training a neural network for face recognition include using external face detection/alignment approaches, such as hand-coded and filtered input images to reduce the extensive variations before feeding images into the face recognition network. However, the dependence of external system makes these approaches less efficient and prone to outliers. Alternative approaches include training deep end-to-end neural network for recognition without data preprocessing. However, such an approach uses billions of parameters, requiring hundreds of millions of training data samples, and large amounts of computing resources, such as memory, processing, power and so on. For example, typical face recognition deep neural networks, which use 120 million parameters, require a training data set that includes at least 4 million images, (Taigman et al., CVPR Jun. 24, 2014, "DeepFace: Closing the Gap to Human-Level Performance in Face Verification"), or even 200 million images (Schroff et al., CVPR Jun. 25, 2015, "FaceNet: A unified Embedding for Face Recognition and Clustering").

The typical technical solutions for training a neural network, such as a deep face recognition neural network, address training a high performance (i.e., high accuracy) visual model either by using a predetermined "alignment" model or using a large number of labeled and curated objects, in this example, faces. The technical solutions described herein improve the training of such neural networks by increasing the efficiency of the training. The improvements facilitate training the neural network using a smaller training data set, which may be an order of magnitude or more smaller than a training dataset used by the typical solutions. Additionally, the improvements facilitate training the neural networks using reduced computations, which further facilitates using apparatus such as a phone, a tablet computer, a laptop, a desktop, or any other computing device to be used for training the neural network.

Figure 2:
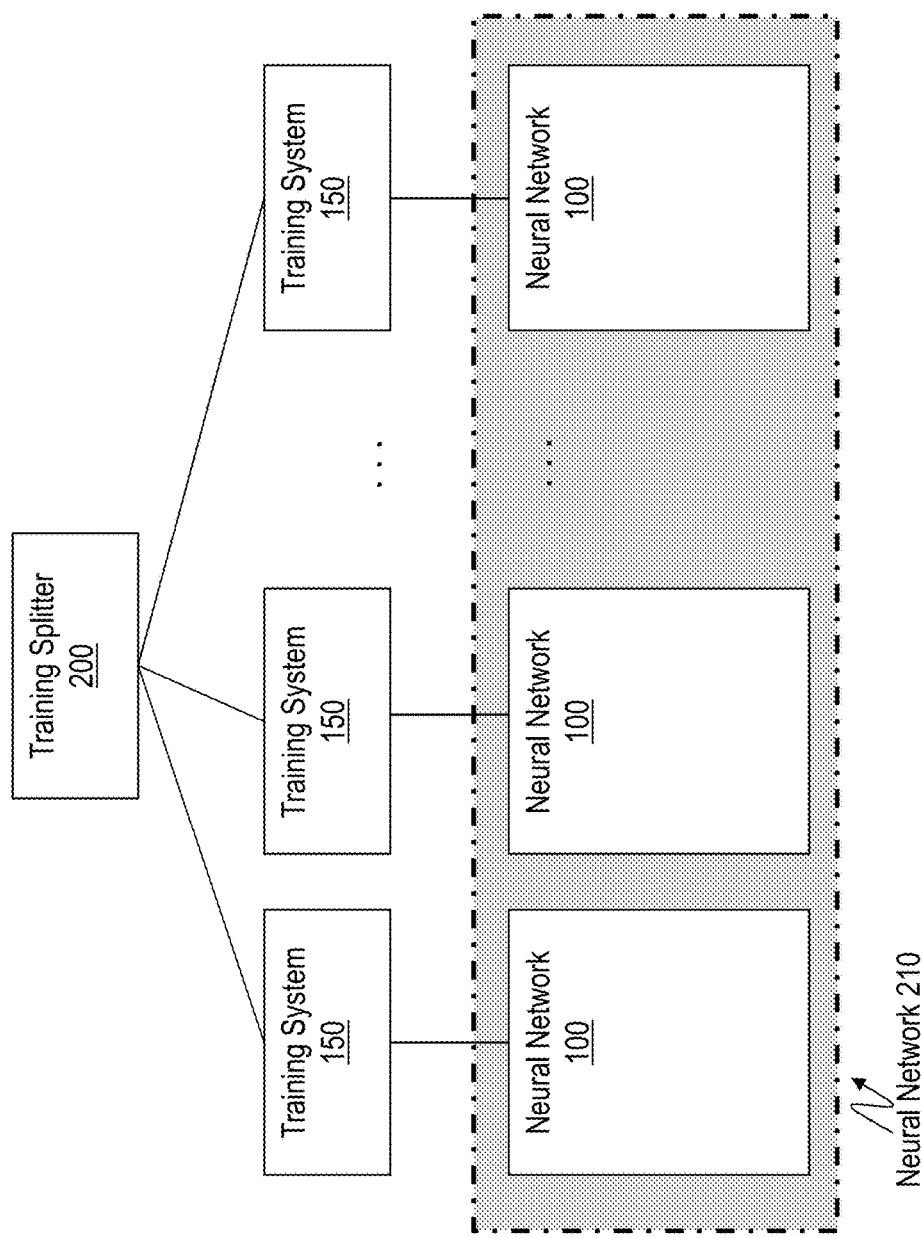
FIG. 2 illustrates an example system for training a neural network with limited data and computational resources in accordance with an embodiment.

FIG. 2 illustrates an example system for training a neural network 210 by utilizing limited data and computational resources. The system includes a training splitter 200 that communicates with multiple training systems 150. The training splitter 200 splits the training of the neural network 210 into training multiple neural networks 100 using respective training systems 150, as illustrated.

Figure 3:
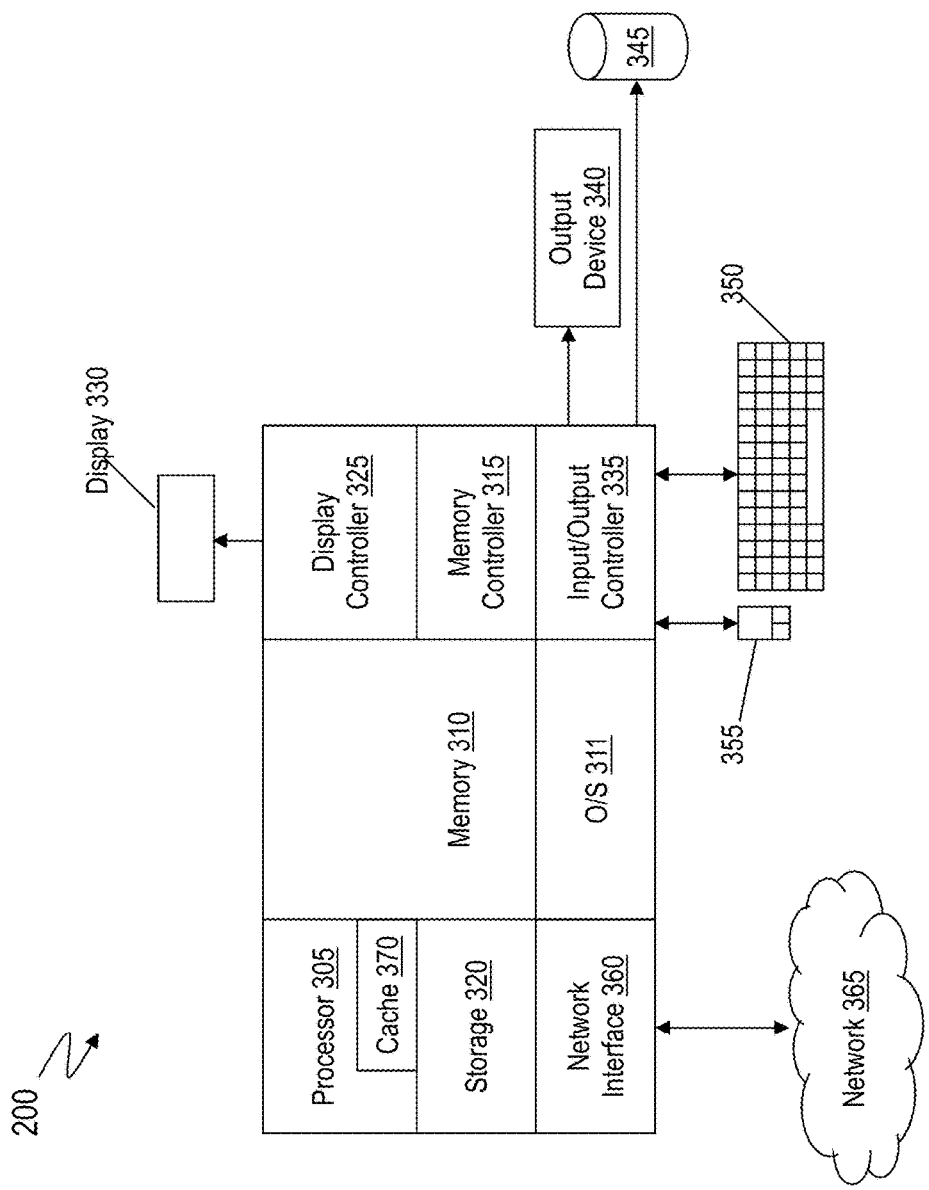
FIG. 3 illustrates an example training splitter in accordance with an embodiment.

FIG. 3 illustrates an example training splitter 200. The training splitter 200 may be a communication apparatus, such as a computer. For example, the training splitter 200 may be a desktop computer, a tablet computer, a laptop computer, a phone, such as a smartphone, a server computer, or any other device that communicates via a network 365. The training splitter 200 includes hardware, such as electronic circuitry.

The training splitter 200 includes, among other components, a processor 305, memory 310 coupled to a memory controller 315, and one or more input devices 345 and/or output devices 340, such as peripheral or control devices, which are communicatively coupled via a local I/O controller 335. These devices 340 and 345 may include, for example, battery sensors, position sensors (altimeter 40, accelerometer 42, GPS 44), indicator/identification lights and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the training splitter 200, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, and so on.).

The memory 310 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 2, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the systems and methods of this disclosure.

The training splitter 200 may further include a display controller 325 coupled to a user interface or display 330. In some embodiments, the display 330 may be an LCD screen. In other embodiments, the display 330 may include a plurality of LED status lights. In some embodiments, the training splitter 200 may further include a network interface 360 for coupling to a network 365. The network 365 may be an IP-based network for communication between the training splitter 200 and an external server, client and the like via a broadband connection. In an embodiment, the network 365 may be a satellite network. The network 365 transmits and receives data between the training splitter 200 and external systems. In some embodiments, the network 365 may be a managed IP network administered by a service provider. The network 365 may be implemented in a wireless fashion, for example, using wireless protocols and technologies, such as WiFi, WiMax, satellite, or any other. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

By splitting the training of the neural network 210, the training splitter 200 facilitates making the neural network 210 wider, not deeper (as in the typical approaches). The training splitter 200 splits the neural network 210 into the component neural networks 100 to ensure that the number of parameters encoded identify the variations in unconstrained settings with limited training data, such as labeled images. By widening the neural network 210, the training splitter 200 further ensures that the neural network 210 is not over-fitted with local optimum, which may be the case if the neural network 210 becomes deep, particularly with the limited number of training images in the training data. Further, the training splitter 200 may split the training of the neural network 210 based on phases of the training based on which phases are content-based. For example, the training splitter 200 may split the training into one or more neural networks that are content-unaware and another set of one or more neural networks that are content-aware. Content awareness in this context is related to whether the operations are based on specific content in the input or whether the operations are more generic, such as correcting color, or contrast, or brightness of an image, which may be performed without knowing what objects are in the image.

For example, in addition to the spatial transformer network 410 (shown in FIG. 4) that determines an alignment model, the training splitter may split the face-recognition neural network into component neural networks that respectively determine transformations for correcting content independent attributes such as pose, contrast, resolution, lighting, and other such content independent attributes of the input data or images. For example, a contrast transformer network identifies a contrast model for transforming the input images to a normalized contrast value; a resolution transformer network identifies a resolution model for transforming the input images to a normalized resolution; a lighting (or illumination) transformer network identifies a lighting model for transforming the input images to a normalized lighting. Of course, splitting the face-recognition neural network into fewer, more, or other content-independent or dependent neural networks is possible.

The training splitter 200, after each individual training system 150 completes training the respective neural networks 100, determines parameters, such as spatial transformations. The parameters facilitate tuning the results of the trained neural networks 100 so that the results of the trained networks can be used together to achieve an end-to-end framework.

Figure 4:
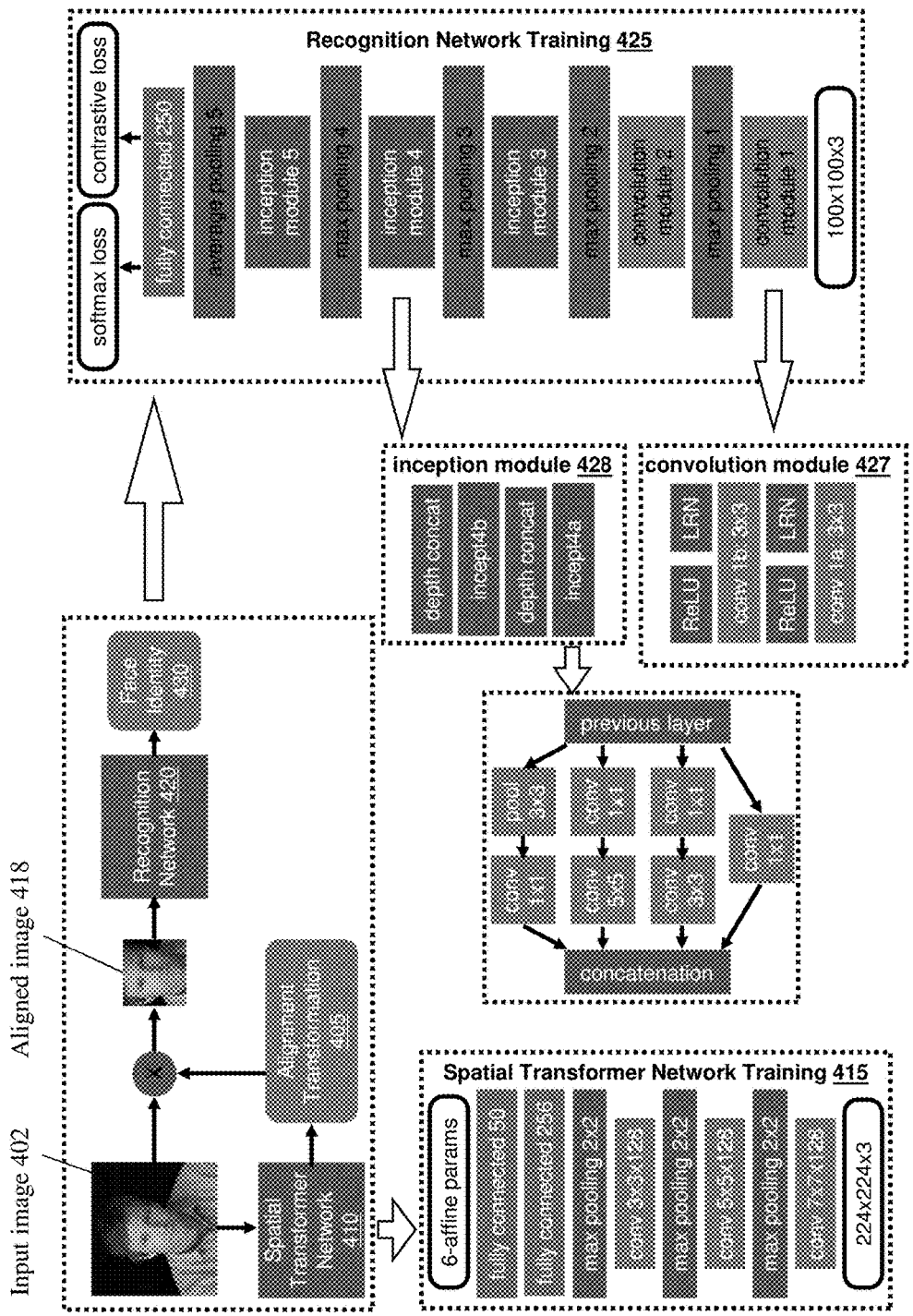
FIG. 4 illustrates an example splitting of a neural network in accordance with an embodiment.

For example, consider the case of the neural network 210 being a face-recognition neural network. FIG. 4 illustrates an example splitting of the neural network 210. In the illustrated example, the training splitter 200 splits the neural network 210 for recognizing faces in three-dimensional space into two neural networks, a spatial transformer network 410 and a recognition network 420. Of course, in other examples, the training splitter 200 may split the neural network 210 in any other manner, such as more or different component neural networks 100.

The spatial transformer network 410 learns to predict an alignment transformation 405 for an input image 402. For example, the alignment transformation 405 may be an affine transformation that corrects a pose of an object, in this case a face, in the input image 402. For example, the alignment transformation 405 may include 6 affine transformation parameters for face alignment. For example, the spatial transformer network 410 is trained to perform face detection and alignment to reduce variations in the poses of faces in the input image 402. The input image 402 includes data that includes three-dimensional facial data in any format and resolution. Determining the alignment transformation 405 may include the spatial transformer network 410 training the layers of using techniques such as max-pooling and/or identifying local fully connected layers. Thus, the training system 150 that manages training of the spatial transformer network 410 may perform various operations as shown at block 415, to determine one or more convolution matrices, and connections between the successive layers of the spatial transformer network 410 to identify the alignment transformation 405.

In an example, a first training system 150 that trains the spatial transformer network 410 separately from a second training system 150 that trains the recognition network 420. The two trainings may use different, distinct training datasets.

Figure 5:
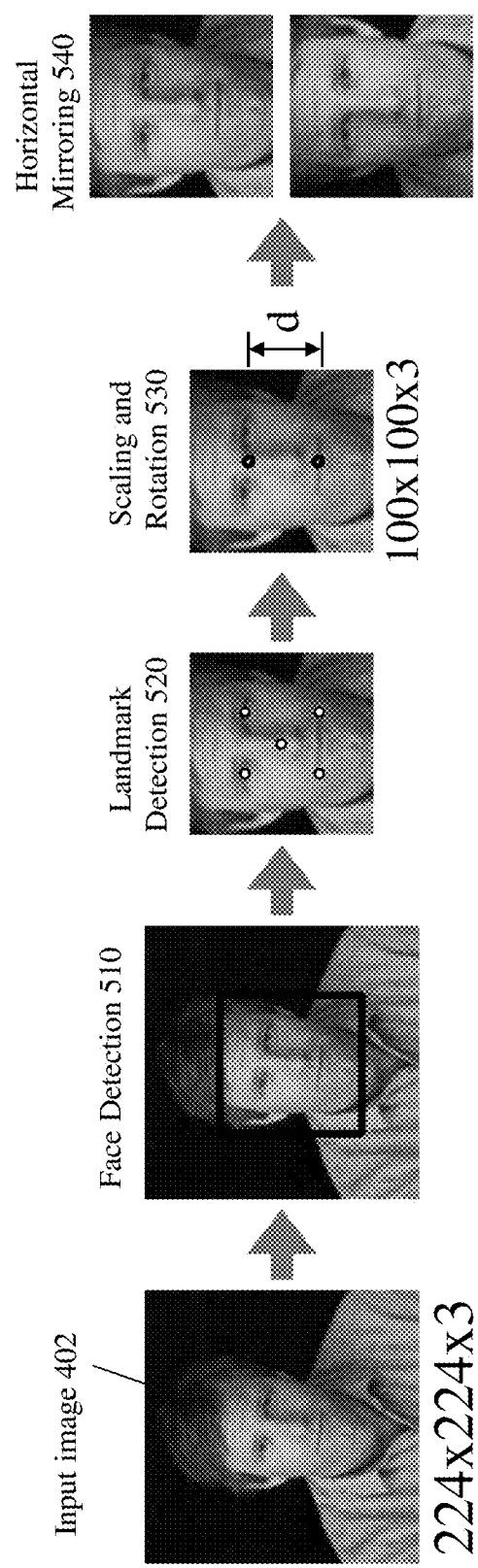
FIG. 5 illustrates an example of a first training system training a spatial transformer network in accordance with an embodiment.

FIG. 5 illustrates an example of the first training system 150 training the spatial transformer network 410. For example, the spatial transformer network 410 is trained to perform face detection 510 to detect a face in the input image 402. The spatial transformer network 410 may further perform 5-point landmark localization 520, to identify predetermined landmarks on the detected face. The spatial transformer network 410 may further scale and perform in-plane 2D rotation 530 of the detected face and the corresponding landmarks. The spatial transformer network 410 may further perform horizontal mirroring 540 to facilitate a consistent pose of the detected face in the input image 402. The alignment transformation 405 includes the parameters that are identified as a result of the above operations. The resolution of the input image 402 may change by applying the alignment transformation 405. Of course, although FIG. 5 illustrates a change in resolution from 224×224×3 to 100×100×3, other resolutions are possible.

Referring back to FIG. 4, the recognition network 420 takes the aligned image 418 as input for recognition task. The aligned image 418 is obtained by applying the alignment transformation 405 to the input image 402. The recognition network 420 outputs an identity 430 of a face recognized in the input image 402.

The second training system 150 trains the recognition framework 420 to identify a face in the aligned image 418 that is received from the spatial transformer network 410. Training the recognition framework 420 is trained to identify a face without knowledge of the alignment transformation 405, rather directly using the aligned image 418. Training 425 of the recognition framework 420 is separate from the training performed by the first training system, and includes identifying the backpropagation relationships for the recognition framework. The training 425 includes using a convolution module 427 and an inception module 428. The inception module 428 facilitates using 1×1 convolutions with small feature map size to identify one or more convolutions. For example, the inception module 428 may reduce 192 28×28 sized feature maps to 64 28×28 feature maps through 64 1×1 convolutions. Because of the reduced size, the 1×1 convolutions can be followed up with larger convolutions of size 3×3 and 5×5. In addition to 1×1 convolution, max pooling may also be used to reduce dimensionality. Further yet, in an output of the inception module 428, the large convolutions are concatenated into a big feature map, which is fed into a next layer of the recognition network 420.

In an example, the training of the recognition framework 420 is performed using the alignment images that are obtained based on the alignment transformation from the spatial transformer network 410. Alternatively or in addition, the second training system 150 uses a separate training dataset (independent of the spatial transformer network 410) for training the recognition network 420.

Figure 6:
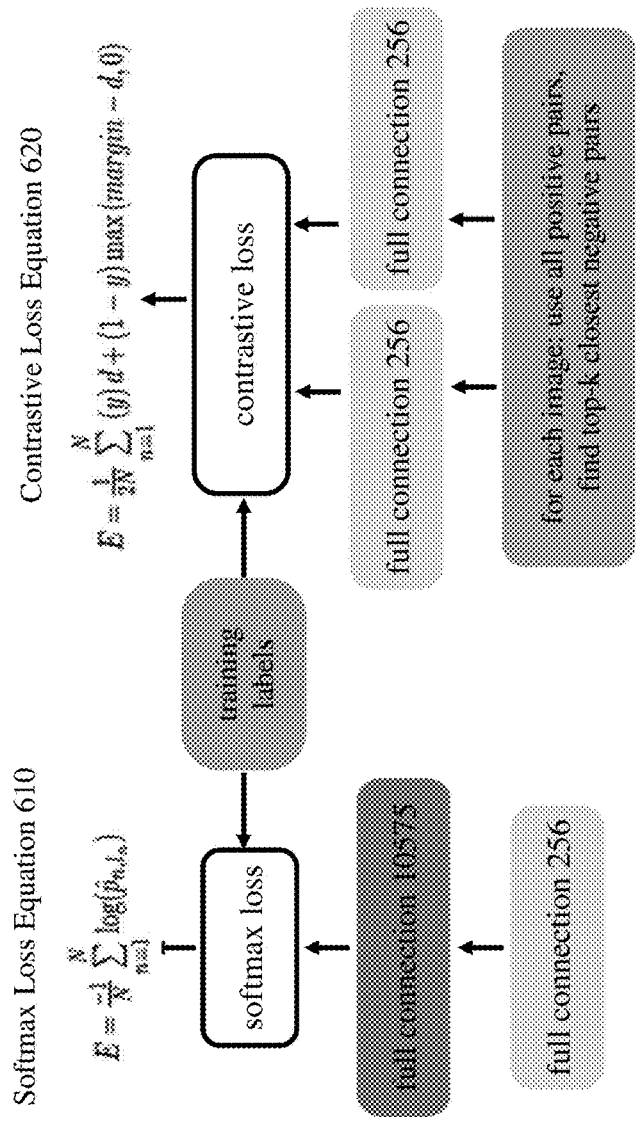
FIG. 6 illustrates an example training of a recognition framework using backpropagation of multiple losses in accordance with an embodiment.

FIG. 6 illustrates an example training of the recognition framework 420 using backpropagation of multiple losses, such as a softmax loss and a contrastive loss. For example, using the convolution module 427 and the inception module 428, the training of the inception module 428 computes a softmax loss of one or more of the layers in the recognition network 420 using a predetermined equation such as a softmax loss equation 610 (shown in FIG. 6). Additionally or alternatively, the inception module 428 may compute a contrastive loss between one or more of the layers of the recognition framework 420 using a predetermined equation such as a contrastive loss equation 620 (shown in FIG. 6). As illustrated, the losses may be back propagated for a fully connected neural network. Of course, although computing a softmax loss and a contrastive loss are illustrated, other backpropagation errors may be computed in addition for determining the identity 430 of a face in the images input to the recognition framework 420.

Figure 7:
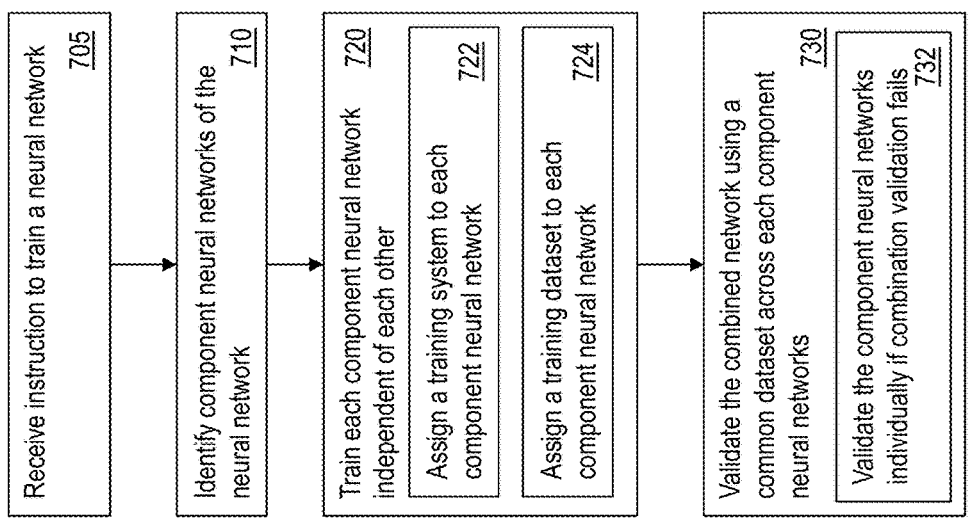
FIG. 7 illustrates a flowchart of an example method to train a neural network by splitting the neural network in accordance with an embodiment.

FIG. 7 illustrates a flowchart of an example method to train a neural network, such as the face recognition framework by splitting the neural network. The method may be implemented by a system that includes the training splitter 200 and the training systems 150 using other hardware components and/or computer executable instructions. The system receives an instruction to train a neural network, such as a neural network to identify an object in an image, for example, the face-recognition neural network described herein, as shown at block 705. The instruction may include or identify the training data to be used during the training. Alternatively or in addition, the system may use predetermined training data.

The training splitter 200 splits the neural network into component neural networks, as shown at block 710. In an example, the split may be based on content awareness. For example, for the neural network for recognizing an object, the training splitter 200 may determine component neural networks that are content independent, for example the spatial transformer network 410. For example, the training splitter 200 splits the overarching neural network into component neural networks for determining a transformation for correcting content independent attributes such as pose, contrast, resolution, lighting, and other such content independent attributes of the input data or images. The training splitter 200 further identifies component neural networks for the content dependent portion, such as recognizing the objects in the images, for example the recognition framework 420.

The system further trains each component neural network independent of each other, as shown at block 720. For example, the training includes assigning a training system 150 to each component neural network, as shown at block 722. For example, the training splitter 200 may assign a first training system to train a first component neural network and assign a second training system 150, distinct from the first training system 150. In an example, the first training system 150 may be a first processor (or processor core) and the second training system 150 may be a second processor (or processor core) in the same system.

Further, the system assigns a training dataset to each component neural network, as shown at block 724. For example, the training splitter 200 may assign a separate training dataset to each component neural network. Accordingly, the component neural networks may be trained in parallel. For example, the first training system 150 trains the first component neural network using a first training dataset substantially simultaneously while the second training system 150 trains the second component neural network using a second training dataset. In another example, the first output of the training of the first component neural network may be used as an input for training the second component neural network. In such a case, the two component neural networks may be trained sequentially. However, a third component neural network may be trained in parallel with the first component neural network.

Further, once all the component networks are trained, the system validates the combination of the component neural networks, as shown at block 730. For example, the validation includes operating the component neural networks sequentially using outputs from one component neural network as an input to a sequentially next component neural network. Additionally, during the validation, the sequence of the component neural networks may use a common dataset. For example, a sequentially first component neural network operates on an input dataset. The input data in the input dataset is transformed using the output of the sequentially first component neural network to obtain a transformed input data. In another example, the system may transform the input data using the output of more than one component neural networks. For example, the system may transform the input data using the output of each of the content-independent component neural networks. The content dependent neural networks may then operate on the transformed input data.

Based on the result of the content-based neural network(s), the system may determine whether the training is acceptable; for example, whether accuracy of the combined neural network is above a predetermined acceptable value. In case the training is not successfully validated, that is the result is below the acceptable value, the system may validate the component neural networks individually and identify if one or more individual component neural networks are to be further trained, as shown at block 732. The system may train such identified component neural networks further and repeat the validation process for the overarching neural network.

Thus, the method trains the combined neural network, such as the face recognition neural network, by training the component neural networks independently. By training the independent component neural networks separately, the system facilitates improved efficiency as training the component neural networks require fewer resources, such as processing power and training data, than when training the overarching neural network as a whole. For example, FIG. 8 illustrates a comparison of using a face-recognition neural network trained using different approaches. As illustrated, if the network is trained using the technical solutions described herein the number of training images required is an order of magnitude lesser than the typical solutions without significant drop in accuracy. Additionally, the computational resources used for training the component neural networks independently are lesser in comparison to training the neural network as a whole.

Thus, the technical solutions facilitate training a neural network by splitting the neural network into multiple component neural networks. The split may be based on content-dependent and content-independent neural networks. For example, in case of a neural network for identifying or recognizing an object in an image, the content-independent neural networks may be those that determine transformations for attributes such as pose, occlusion, illumination, resolution, chronology, expression, surroundings (decoration), and so on. The content dependent neural network in this case may include the neural network that identifies the object, or person associated with the object, such as a face in the input image.

For example, in case of the neural network for building a visual model for identifying the object from the input data (such as images and videos), the technical solutions decompose the neural network into at least two component neural network. A first component neural network is trained for determining a visual alignment model that determines a transformation for transforming the input data into normalized form. A second component neural network is trained for determining a model of aligned visual representation to recognize the object upon transformation. The technical solutions may further include a combined training of the two component networks using the training data to learn a joint alignment and representation model, where the combined network is used for recognizing the object in an unknown image.

Further, in case of the neural network for building a visual model for identifying the object from the input data, the technical solutions may decompose the neural network into other content-dependent and content-independent neural networks. For example, the split may result in content-independent networks for each of the content-independent parameters, such as P-Pose; O-Occlusion; L-Low resolution; I-Illumination; C-Chronology (age progression); E-Expression; D-Decoration (surrounding the object). Thus, in an example, the neural network may be split into a neural network each for the content-independent parameters and at least one content-dependent neural network that is trained for identifying the object. Of course, it will be understood that which parameters are content-independent and which parameters are content-dependent will vary based on the goal of the overarching neural network. For example, in case the goal of the overarching neural network is to identify illumination, the neural network that is trained to identify the illumination model is the content-dependent network. It is further understood that additional content-dependent and/or content-independent parameters may be used other than those listed herein.

In an example, the component neural networks may be trained using pre-aligned (for example, frontal faces) followed by the faces in the unconstrained pose. For example, the component neural networks may be trained independently using aligned faces to guarantee fast convergence in both face recognition and verification tasks. The original training images may be pre-processed with face detection, 5-point landmark detection, 2-D alignment, and horizontal mirroring to output aligned faces. The technical solutions may further include validating the neural network as well as the component neural networks individually.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, or N including any one element alone or the one element in combination with one or more of the other elements, which may also include, in combination, additional elements, not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device, accessible, or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer-implemented method for training an object-recognition neural network to identify an object in a computer-readable image, the method comprising:
    assigning, using a processor system, a first neural network for determining a visual alignment model of a plurality of input images, wherein the visual alignment model is used to determine a normalized alignment of an object in the input images;
    assigning, using the processor system, a second neural network for determining a visual representation model of the input images, wherein the visual representation model is used to recognize the object in the input images;
    determining the visual alignment model by training the first neural network;
    determining the visual representation model by training the second neural network;
    determining a combined object recognition model by training a combination of neural networks comprising the first neural network and the second neural network; and
    recognizing the object in the computer-readable image based on the combined object recognition model by passing the computer-readable image through the first neural network and the second neural network of the combination of neural networks.

2. The computer-implemented method of claim 1, further comprising:
    splitting an object-recognition neural network into a plurality of independent networks including the first neural network and the second neural network, wherein a first subset of the independent networks operates on content-based attributes of the images and a second subset of the independent networks operates on content-unaware attributes of the images.

3. The computer-implemented method of claim 1, wherein the visual alignment model is determined by training the first neural network using a first set of images and the visual representation model is determined by training the second neural network using a second set of images.

4. The computer-implemented method of claim 3, wherein the combined object recognition model is determined by training a combination of the first neural network and the second neural network using a third set of images, distinct from the first set of images and the second set of images.

5. The computer-implemented method of claim 1, wherein the first neural network is trained in parallel to the second neural network.

6. The computer-implemented method of claim 5, wherein the first neural network is trained by a first computer system and the second neural network is trained by a second computer system, which is distinct from the first computer system.

7. The computer-implemented method of claim 1, wherein the first neural network is trained by a first processor in parallel to the second neural network being trained by a second processor.

8. The computer-implemented method of claim 1, further comprising:
assigning a third neural network for determining a contrast normalization model of the images, wherein the contrast normalization model is used to determine a normalized contrast value of the input images; and
determining the combined object recognition model by further training a combination of the first neural network, the second neural network, and the third neural network.

9. The computer-implemented method of claim 8, wherein recognizing the object in the computer-readable image based on the combined object recognition model comprises:
passing the computer-readable image to the first neural network and to the third neural network in parallel; and
passing outputs of the first neural network and the third neural network to the second neural network, wherein the second neural network recognizes the object in the computer-readable image based on the respective outputs.

10. The computer-implemented method of claim 1, wherein determining the normalized alignment by training the first neural network comprises determining transformations in 3-dimensional space to align the object in the computer-readable image in a normalized position.

11. A system for training an object-recognition neural network to identify an object in a computer-readable image, the system comprising:
a memory; and
a processor communicatively coupled to the memory, wherein the processor is configured to:
assign a first neural network for determining a visual alignment model of a plurality of input images, wherein the visual alignment model is used to determine a normalized alignment of an object in the input images;
assign a second neural network for determining a visual representation model of the input images, wherein the visual representation model is used to recognize the object in the input images;
determine the visual alignment model by training the first neural network;
determine the visual representation model by training the second neural network;
determine a combined object recognition model by training a combination of neural networks comprising the first neural network and the second neural network; and
recognize the object in the computer-readable image based on the combined object recognition model by passing the computer-readable image through the first neural network and the second neural network of the combination of neural networks.

12. The system of claim 11, wherein the processor is further configured to split an object-recognition neural network into a plurality of independent networks including the first neural network and the second neural network, wherein a first subset of the independent networks operates on content-based attributes of the images and a second subset of the independent networks operates on content-unaware attributes of the images.

13. The system of claim 11, wherein the visual alignment model is determined by training the first neural network using a first set of images and the visual representation model is determined by training the second neural network using a second set of images.

14. The system of claim 13, wherein the combined object recognition model is determined by training a combination of the first neural network and the second neural network using a third set of images, distinct from the first set of images and the second set of images.

15. The system of claim 11, wherein the first neural network is trained in parallel to the second neural network.

16. The system of claim 11, wherein the first neural network is trained by a first computer system and the second neural network is trained by a second computer system, which is distinct from the first computer system.

17. A computer program product for training an object-recognition neural network to identify an object in a computer-readable image, the computer program product comprising a non-transitory computer readable storage medium, the computer readable storage medium comprising computer executable instructions, wherein the computer readable storage medium comprises instructions to:
assign a first neural network for determining a visual alignment model of a plurality of input images, wherein the visual alignment model is used to determine a normalized alignment of an object in the input images;
assign a second neural network for determining a visual representation model of the input images, wherein the visual representation model is used to recognize the object in the input images;
determine the visual alignment model by training the first neural network;
determine the visual representation model by training the second neural network;
determine a combined object recognition model by training a combination of neural networks comprising the first neural network and the second neural network; and
recognize the object in the computer-readable image based on the combined object recognition model by passing the computer-readable image through the first neural network and the second neural network of the combination of neural networks.

18. The computer program product of claim 17, wherein the visual alignment model is determined by training the first neural network using a first set of images and the visual representation model is determined by training the second neural network using a second set of images.

19. The computer program product of claim 18, wherein the combined object recognition model is determined by training a combination of the first neural network and the second neural network using a third set of images, distinct from the first set of images and the second set of images.

20. The computer program product of claim 17, wherein the first neural network is trained in parallel to the second neural network, and wherein the first neural network is trained by a first computer system and the second neural network is trained by a second computer system, which is distinct from the first computer system.

* * * * *